United States Patent
Streifinger et al.

(10) Patent No.: US 10,259,484 B2
(45) Date of Patent: Apr. 16, 2019

(54) STEERING WHEEL WITH A SENSOR STRUCTURE FOR DETECTING THE OCCUPANCY OF A HEATED CONTACT SURFACE, STEERING WHEEL SYSTEM, AND METHOD FOR DETECTING THE OCCUPANCY OF A HEATED CONTACT SURFACE

(71) Applicant: Bayerische Motoren Werke Aktiengesellschaft, Munich (DE)

(72) Inventors: Michael Streifinger, Schrobenhausen (DE); Stefan Heller, Isen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/482,034

(22) Filed: Apr. 7, 2017

(65) Prior Publication Data

US 2017/0210409 A1  Jul. 27, 2017

Related U.S. Application Data

(63) Continuation of application No. PCT/EP2015/075313, filed on Oct. 30, 2015.

(30) Foreign Application Priority Data

Nov. 12, 2014 (DE) .................. 10 2014 223 128

(51) Int. Cl.
*B62D 1/04* (2006.01)
*B62D 1/06* (2006.01)
(Continued)

(52) U.S. Cl.
CPC .............. *B62D 1/046* (2013.01); *B62D 1/06* (2013.01); *B62D 1/065* (2013.01); *G01D 5/24* (2013.01); *H05B 3/06* (2013.01)

(58) Field of Classification Search
CPC . B62D 1/046; B62D 1/06; G01D 5/24; H05B 3/06
See application file for complete search history.

(56) References Cited

U.S. PATENT DOCUMENTS

| 7,134,715 | B1 * | 11/2006 | Fristedt | ................. | B60N 2/002 |
| | | | | | 297/180.12 |
| 2001/0030182 | A1 * | 10/2001 | Haag | ..................... | B62D 1/065 |
| | | | | | 219/204 |

(Continued)

FOREIGN PATENT DOCUMENTS

| CN | 102481886 A | 5/2012 |
| CN | 203094159 U | 7/2013 |

(Continued)

OTHER PUBLICATIONS

Cover page of EP 2 519 425 A1 published Nov. 7, 2012 (one (1) page).

(Continued)

*Primary Examiner* — Daniel Miller
(74) *Attorney, Agent, or Firm* — Crowell & Moring LLP

(57) ABSTRACT

A steering wheel is provided with a sensor structure for detecting the occupancy of a heated contact surface. The steering wheel includes a contact surface which forms at least one part of the outer layer of the steering wheel; a steering wheel frame; a sensor heating layer which is equipped with at least one sensor electrode for occupancy detection and at least one heating wire; and a potential layer which is arranged between the sensor heating layer and the steering wheel frame. A defined potential can be applied to the potential layer.

10 Claims, 1 Drawing Sheet

(51) Int. Cl.
*G01D 5/24* (2006.01)
*H05B 3/06* (2006.01)

(56) References Cited

U.S. PATENT DOCUMENTS

| | | |
|---|---|---|
| 2005/0242965 A1 | 11/2005 | Rieth et al. |
| 2009/0199676 A1 | 8/2009 | Kandler |
| 2013/0009654 A1 | 1/2013 | Kandler |
| 2014/0132042 A1 | 5/2014 | Midderhoff et al. |
| 2014/0151356 A1 | 6/2014 | Maguire et al. |
| 2014/0175078 A1 | 6/2014 | Davignon et al. |
| 2014/0224040 A1 | 8/2014 | Van'tZelfde et al. |
| 2014/0253151 A1 | 9/2014 | Kandler et al. |
| 2015/0048845 A1* | 2/2015 | Petereit ............... H03K 17/955 324/663 |
| 2016/0096543 A1* | 4/2016 | Naitou ................ B62D 1/065 219/204 |

FOREIGN PATENT DOCUMENTS

| | | |
|---|---|---|
| DE | 10 2011 084 903 A1 | 4/2013 |
| DE | 10 2012 024 903 A1 | 6/2014 |
| EP | 2 028 078 A1 | 2/2009 |
| EP | 2 572 942 A1 | 3/2013 |
| WO | WO 2008/003558 A1 | 1/2008 |
| WO | WO 2011/080323 A1 | 7/2011 |
| WO | WO 2013/117719 A1 | 8/2013 |
| WO | WO 2014/085577 A1 | 6/2014 |

OTHER PUBLICATIONS

Cover page of EP 1 931 539 A1 published Jun. 18, 2008 (one (1) page).
International Search Report (PCT/ISA/210) issued in PCT Application No. PCT/EP2015/075313 dated Feb. 5, 2016 with English-language translation (six (6) pages).
German-language Written Opinion (PCT/ISA/237) issued in PCT Application No. PCT/EP2015/075313 dated Feb. 5, 2016 (five (5) pages).
German Search Report issued in counterpart German Application No. 10 2014 223 128.0 dated Jun. 12, 2015 with partial English-language translation (ten (10) pages).
Chinese Office Action issued in Chinese counterpart application No. 201580044867.X dated Jul. 3, 2018, with English translation (Thirteen (13) pages).

* cited by examiner

STEERING WHEEL WITH A SENSOR STRUCTURE FOR DETECTING THE OCCUPANCY OF A HEATED CONTACT SURFACE, STEERING WHEEL SYSTEM, AND METHOD FOR DETECTING THE OCCUPANCY OF A HEATED CONTACT SURFACE

CROSS REFERENCE TO RELATED APPLICATIONS

This application is a continuation of PCT International Application No. PCT/EP2015/075313, filed Oct. 30, 2015, which claims priority under 35 U.S.C. § 119 from German Patent Application No. 10 2014 223 128.0, filed Nov. 12, 2014, the entire disclosures of which are herein expressly incorporated by reference.

BACKGROUND AND SUMMARY OF THE INVENTION

The technology disclosed here relates to a steering wheel with a sensor structure for detecting the occupancy of a heated contact surface, to a steering wheel system and to a method for detecting the occupancy of a heated contact surface. Steering wheels with a capacitive sensor element for detecting occupancy or for hands-off detection (HOD) are known from the prior art. It is also known to provide steering wheels with HOD detection additionally with electric heating elements. In this context, parasitic capacitances between a capacitive sensor element and a heating wire of a heating element may change as a function of the temperature of the heating wire, and as a result cannot be controlled.

DE 10 2011 084 903 A1 discloses a sensor system for a steering wheel of a motor vehicle having a shielding element which is embodied in a planar fashion and to which an electrical potential can be applied. The shielding element is arranged between a layer having the heating element and the sensor conductor which is applied further outward. The structure which is disclosed in this document comprises a plurality of layers. A comparatively more complex and more cost-intensive fabrication process is necessary to attach the plurality of layers to the steering wheel at the desired locations. The large number of individual layers each have tolerances, both in terms of their layer thickness and their length dimensions and width dimensions. These tolerances of the individual layers add together to form a comparatively large overall tolerance, as a result of which the available sensor surface and heatable surface shrinks disproportionately. The heating layer is also arranged relatively far inward. The achievable heating power is therefore relatively small. In addition, it takes a comparatively long time until the outer layers of the steering wheel heat up.

A preferred object of the technology disclosed here is to reduce or eliminate the disadvantages of the previously known solution.

The technology disclosed here relates to a steering wheel with a sensor structure for detecting the occupancy of a heated contact surface. The steering wheel can be, for example, a leather steering wheel. The sensor structure can be, in particular, a structure of a capacitive sensor with which it is possible to detect whether a motor vehicle driver has his hands on the steering wheel. Such sensors are also referred to as HOD sensors or as sensors for hands-off detection.

The steering wheel has at least one contact surface or contact layer (the term "contact surface" is used below for the sake of simplicity) which forms at least one part of the outer layer of the steering wheel. In other words, the outer layer or the contact surface is that surface with which the driver's hands come into contact.

The steering wheel also has a steering wheel frame which is preferably surrounded at least in certain areas by a foam material. The steering wheel frame constitutes the structural core of the steering wheel. The steering wheel frame is generally manufactured from a metallic material. At least one potential is applied to the steering wheel frame, which potential is unclear and can change owing to an undefined resistance.

The steering wheel also has a sensor heating layer in which at least one sensor electrode for detecting occupancy and at least one heating wire are arranged. The sensor heating wire is preferably arranged directly adjacent to the contact surface. In other words, in one preferred refinement the contact surface is located directly on the sensor heating layer. The at least one sensor electrode is the electrode of a capacitive sensor for detecting occupancy. Such sensors per se are known. If the driver of the vehicle touches the surface of the steering wheel the capacitance changes and the sensor electrode is able to detect the change in capacitance. The at least one heating wire can be, for example, part of a resistance heating device. The sensor heating layer is configured, in particular, in such a way that the at least one sensor electrode and the at least one heating wire extend essentially in one plane or layer. The at least one sensor electrode and the at least one heating wire are preferably arranged located one next to the other at least in certain areas in the sensor heating layer. The at least one sensor electrode and the at least one heating wire preferably extend in such a way that they do not touch one another.

The steering wheel also has a potential layer or shielding layer (the term "potential layer" is used below for the sake of simplicity) which is arranged between the sensor heating layer and the steering wheel frame. A defined potential can be applied to the potential layer. The potential layer can bear, for example, on the foam material of the steering wheel frame. The potential layer preferably surrounds the steering wheel layer. A defined potential means in this context that the potential is specified or known or predefined by a controller. The defined potential is therefore not a potential which changes in an undefined way such as can be found, for example, on the steering wheel frame. The defined potential is preferably a signal which changes and which follows the variable signal of the sensor electrode. As a result, no electrical field, or only a very small electrical field, builds up in the interior of the steering wheel from the sensor mat to the steering wheel frame. The electrical field is therefore "forced" to build up from the sensor electrode to the surrounding vehicle mass, bodywork, etc.

The defined potential is preferably a potential which is different from the reference mass of the motor vehicle. Owing to the unknown resistance, the reference mass of the motor vehicle is not suitable to be used for the sensor as a reference potential. The reference mass itself is undefined for this. The reference potential of the motor vehicle acts from the outside, preferably only via the driver, on the measurement system and changes the capacitance. In contrast, the potential of the shield shields the measurement system from the reference potential/the reference mass and is generally different from the vehicle mass. The potential of the potential layer is preferably between approximately 0 V and 14 V, more preferably between approximately 0 V and approximately 12 V, and particularly preferably between approximately 0 V and approximately 5 V. A potential with a sinusoidal profile is preferably present at the potential layer.

The costs of the development and fabrication for a steering wheel with a heating device and occupancy detection device can be significantly reduced by eliminating a plurality of functional layers. The heating wires can then be accommodated closer to the surface. As a result, the heating speed and the power of the steering wheel heating device can be increased. At the same time, the subjective heating power can be increased since the heated surface is moved closer to the surface of the steering wheel. The accuracy of the measured values can also be increased by virtue of the fact that a defined and known potential can be applied to the potential layer between the sensor heating layer and the steering wheel frame, which potential does not change significantly as a result of any interference variable as is the case, for example, with the steering wheel frame.

The at least one sensor electrode and the at least one heating wire in particular preferably extend in a meandering shape or looped shape in the sensor heating layer. In a further refinement, the at least one sensor electrode and the at least one heating wire can be wound in a helix shape onto the potential layer, which extends, at least in certain areas, along the steering wheel frame in such a way as to enclose it. An insulating layer can also be provided between the potential layer and the sensor heating layer.

According to the invention, the surface for the heating wire and the surface for the sensor wire are therefore placed in one plane. For this purpose, further loops for the heating wire are positioned, for example, parallel to the loops of the sensor surface. In this context, the heating surface and sensor surface preferably bear directly on the outside of the steering wheel sheath and are further preferably supported on the inside by a plastic foam. This plane is shielded from the steering wheel frame by the potential layer.

The sensor heating layer can have at least one further potential electrode or shielding wire. A potential can be applied to the at least one further potential electrode at least during the occupancy detection phase. It is therefore also possible to provide further wire loops which can control the propagation of an electrical field by connection to defined electrical potentials. In particular, the potential electrodes can also shield the electrical field. The potential of the potential electrodes preferably follows the voltage profile of the sensor and has therefore the same potential as the shielding layer. The function of the further potential electrode is comparable with the function of the shielding layer. The further potential electrode therefore shields from the potential of the heating wire here.

The technology disclosed here also includes a steering wheel system having the steering wheel disclosed here and a controller. In this context, the term controller can be understood as referring to any suitable open-loop or closed-loop control. It can also include one or more control units.

The controller can actuate the at least one heating wire such that the at least one heating wire heats the steering wheel only in the heating phase (that is to say only during the occupancy detection phase). More preferably, the controller can actuate the at least one sensor electrode such that the at least one sensor electrode determines the potential only in the occupancy detection phase (that is to say not during the heating phase). The heating wire and sensor electrode are therefore preferably connected sequentially. The accuracy of the measured values which are acquired are increased further by the selective connection of the heating wire and sensor electrode during the heating phase and the occupancy detection phase. The heating phase is here the phase during which the at least one heating wire heats the steering wheel. The occupancy detection phase is, in contrast, the phase in which the at least one sensor electrode detects any changes in potential which are triggered by the driver of the vehicle grasping the steering wheel.

In addition, the controller can be configured such that the signals which are detected with the at least one sensor electrode during a heating phase are disregarded during the determination of the occupancy detection. Therefore, according to the technology disclosed here, it is on the one hand possible to actuate the at least one sensor electrode such that the at least one sensor electrode does not determine any potential during the heating phase. On the other hand, it is also possible for the control device to disregard from the evaluation of the occupancy detection any potentials which are determined during the heating phase (possibly undesirably). Therefore, continuous operation of the sensor is also possible. However, the measured values during a heating phase would then be rejected by the controller.

The controller can particularly preferably actuate the at least one heating wire and the at least one sensor electrode such that in an occupancy detection phase a potential which corresponds essentially to the potential of the sensor electrode is applied to the at least one heating wire. As a result, the influence of the heating electrode on the sensor electrode can be reduced further during the occupancy detection phase and even be eliminated if appropriate. The potential of the heating wire preferably differs by at maximum 10% and particularly preferably by at maximum 5% from the potential of the sensor electrode during the occupancy detection phase. The potential of the at least one heating wire particularly preferably corresponds to the potential of the sensor electrode in the occupancy detection phase.

Within the occupancy detection phase it is therefore possible for the sensor to determine, in the case of capacitive sensing, the capacitance without interference influences or with only small interference influences.

The technology disclosed here also includes a method for detecting the occupancy of a heated contact surface, comprising the steps of:
providing a steering wheel according to the technology disclosed here; and
excluding from the determination of the occupancy detection signals detected with the at least one sensor electrode during a heating phase, and/or operating in chronological succession the at least one sensor electrode and the at least one heating wire.

The term "operating in chronological succession the at least one sensor electrode and the at least one heating wire" means here that the controller actuates the at least one heating wire in such a way that the at least one heating wire heats the steering wheel only in the heating phase, and that the controller can actuate the at least one sensor electrode in such a way that the at least one sensor electrode determines the potential only in the occupancy detection phase.

In addition, the method can be such that the at least one heating wire and the at least one sensor electrode are actuated in such a way that in an occupancy detection phase a potential which corresponds essentially to the potential of the sensor electrode is applied to the at least one heating wire.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
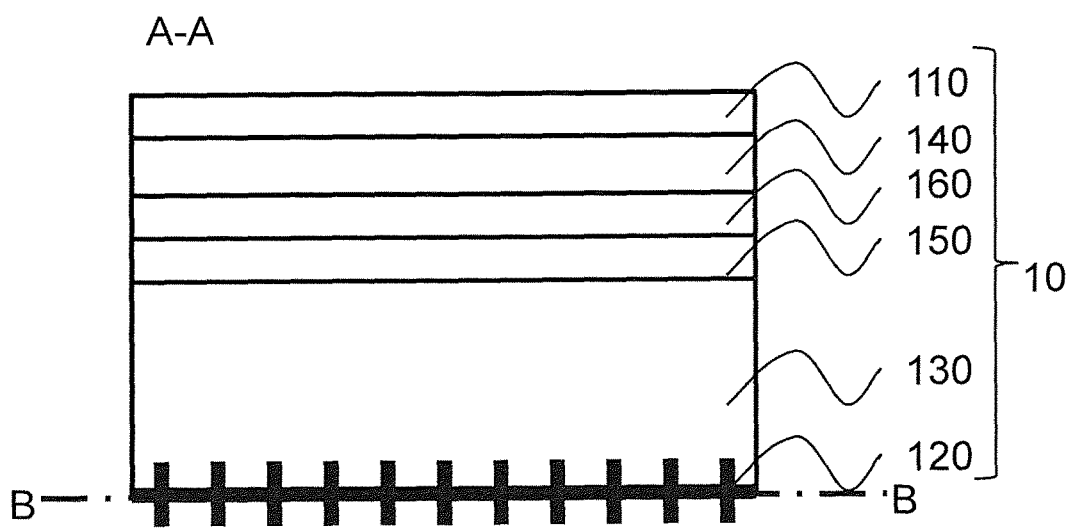
FIG. 1 illustrates a structure according to the technology disclosed here in a cross-sectional view.
Figure 2:
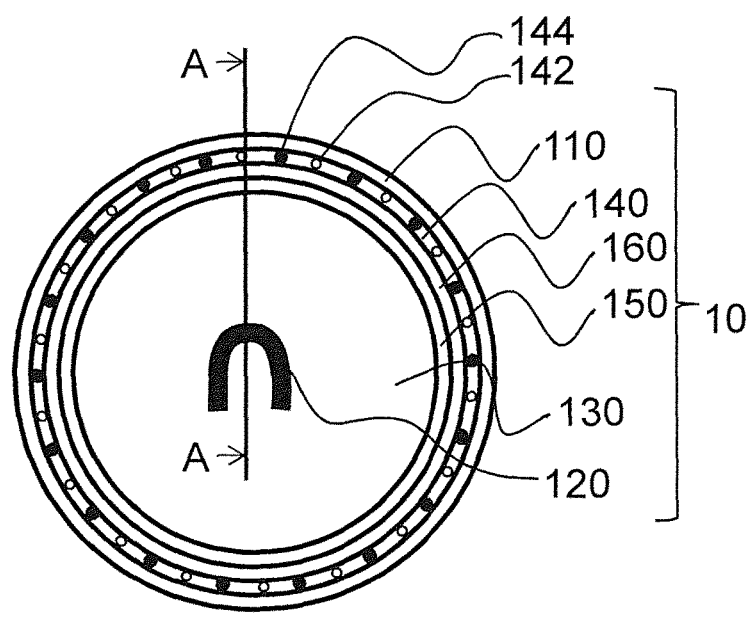
FIG. 2 is a cross section view through a steering wheel rim.

FIG. 1 shows a partial detail of a steering wheel along the line A-A in FIG. 2, wherein only an upper section as far as a line of symmetry B-B is shown. The contact surface 110 which forms the outer layer of the steering wheel rim comes into contact with a driver of the vehicle. The sensor heating layer 140, in which the at least one sensor electrode 142 for detecting occupancy and the at least one heating wire 144 are arranged, is located below the contact surface 110. The sensor electrode 142 and the heating wire 144 are not shown in FIG. 1. An insulation layer 160, which insulates the potential layer 150 from the sensor heating layer 140, is located underneath the sensor heating layer 140. The potential layer 150 is arranged between the sensor heating layer 140 and the steering wheel frame 120. A defined potential can be applied to the potential layer 150 by way of suitable connections and devices. An insulating layer 130 is provided as a foam material which insulates the potential layer 150 from the steering wheel frame 120. It is to be noted that FIG. 1 only shows the sensor structure in a schematic form. The individual layer thicknesses are illustrated in enlarged form only for illustrative purposes. The layer thicknesses which are actually preferred can differ considerably from this. The individual layers and the steering wheel frame 120 are illustrated in cross section in FIG. 1 as layers which extend essentially in a straight fashion. As is apparent, in particular, in combination with FIG. 2, the individual layers generally extend on curved paths as a function of the diameter of the steering wheel.

FIG. 2 shows a cross section through the steering wheel rim. In the cross-sectional view illustrated here, the at least one heating wire 144 and the at least one sensor element 142 are arranged side by side in alternating form in the sensor heating layer 140. Otherwise, the layered structure corresponds to the layered structure according to FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering wheel with a sensor structure for detecting occupancy of a heated contact surface, comprising:
   a contact surface which forms at least one part of an outer layer of the steering wheel;
   a steering wheel frame;
   a sensor heating layer in which at least one sensor electrode for detecting occupancy and at least one heating wire are arranged, wherein the at least one sensor electrode and the at least one heating wire extend in one plane or layer; and
   a potential layer which is arranged between the sensor heating layer and the steering wheel frame, wherein a defined potential is applied to the potential layer.

2. The steering wheel according to claim 1, wherein the defined potential is a potential which is different from a reference mass of a motor vehicle equipped with the steering wheel.

3. The steering wheel according to claim 1, wherein
   the at least one sensor electrode and the at least one heating wire are arranged side by side at least in certain areas and extend in a meandering shape in the sensor heating layer.

4. The steering wheel according to claim 1, wherein
   at least one further potential electrode is provided in the sensor heating layer, and a potential is applied to the further potential electrode at least during an occupancy detection phase.

5. A steering wheel system, comprising:
   a steering wheel according to claim 1; and
   a controller, wherein the controller actuates the at least one heating wire such that the at least one heating wire heats the steering wheel only in a heating phase, and wherein the controller actuates the at least one sensor electrode such that the at least one sensor electrode determines the potential only in an occupancy detection phase.

6. The steering wheel system according to claim 5, wherein
   the controller actuates the at least one heating wire and the at least one sensor electrode such that in the occupancy detection phase a potential which corresponds essentially to the potential of the sensor electrode is applied to the at least one heating wire.

7. A steering wheel system, comprising:
   a steering wheel according to claim 1; and
   a controller, wherein the controller is configured to disregard signals which are detected with the at least one sensor electrode during a heating phase during an occupancy detection phase.

8. The steering wheel system according to claim 7, wherein
   the controller actuates the at least one heating wire and the at least one sensor electrode such that in the occupancy detection phase a potential which corresponds essentially to the potential of the sensor electrode is applied to the at least one heating wire.

9. A method for detecting occupancy of a heated contact surface, the method comprising the steps of:
   providing a steering wheel with a sensor structure for detecting the occupancy of a heated contact surface, comprising:
      a contact surface which forms at least one part of the outer layer of an steering wheel;
      a steering wheel frame;
      a sensor heating layer in which at least one sensor electrode for detecting occupancy and at least one heating wire are arranged, wherein the at least one sensor electrode and the at least one heating wire extend in one plane or layer; and
      a potential layer, which is arranged between the sensor heating layer and the steering wheel frame, wherein a defined potential is applied to the potential layer; and
   excluding from a determination of the occupancy detection those signals detected with the at least one sensor electrode during a heating phase, and/or actuating in chronological succession the at least one sensor electrode and the at least one heating wire.

10. The method according to claim 9, wherein the at least one heating wire and the at least one sensor electrode are actuated such that in an occupancy detection phase a potential which corresponds essentially to the potential of the sensor electrode is applied to the at least one heating wire.

* * * * *